(12) United States Patent
Stewart et al.

(10) Patent No.: US 8,847,920 B2
(45) Date of Patent: Sep. 30, 2014

(54) TIME WINDOWS FOR SENSOR INPUT

(75) Inventors: Aaron Michael Stewart, Raleigh, NC (US); Julie Anne Morris, Raleigh, NC (US); James S. Rutledge, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 594 days.

(21) Appl. No.: 13/036,365

(22) Filed: Feb. 28, 2011

(65) Prior Publication Data
US 2012/0218187 A1 Aug. 30, 2012

(51) Int. Cl.
G06F 3/042 (2006.01)
G06F 3/02 (2006.01)
G06F 3/038 (2013.01)

(52) U.S. Cl.
CPC ............. *G06F 3/021* (2013.01); *G06F 3/042* (2013.01); *G06F 2203/0381* (2013.01); *G06F 3/038* (2013.01)
USPC ........................... 345/175; 345/156; 345/650

(58) Field of Classification Search
USPC ................ 250/216–221; 178/18.01–18.03
See application file for complete search history.

(56) References Cited

U.S. PATENT DOCUMENTS

| 4,613,937 A * | 9/1986 | Batty, Jr. ................. 607/31 |
| 2003/0117370 A1* | 6/2003 | Van Brocklin et al. ........ 345/156 |
| 2010/0300771 A1* | 12/2010 | Miyazaki .................. 178/18.03 |
| 2012/0038674 A1* | 2/2012 | Stergiou et al. .............. 345/650 |

OTHER PUBLICATIONS

Microsoft (pdf file named "How to Enable the Wake from Standby Option for a USB Mouse", from url http://answers.microsoft.com/en-us/windows/forum/windows_xp-desktop/how-to-enable-the-wake-from-standby-option-for-a/ec7d7b86-916a-4a09-9640-504738b1b502).*

* cited by examiner

*Primary Examiner* — Alexander S Beck
*Assistant Examiner* — Charles Zheng
(74) *Attorney, Agent, or Firm* — Brian J. Pangrle

(57) ABSTRACT

An apparatus includes timing circuitry configured to initiate a timing window in response to input sensed by an optical sensor, association circuitry configured to associate the input with additional input sensed by a different optical sensor if the additional input commences during the timing window and filter circuitry configured to filter out additional input sensed by a different optical sensor if the additional input commences after expiration of the timing window and prior to a subsequent initiation of the timing window. Various other apparatuses, systems, methods, etc., are also disclosed.

17 Claims, 8 Drawing Sheets

US 8,847,920 B2

TIME WINDOWS FOR SENSOR INPUT

TECHNICAL FIELD

Subject matter disclosed herein generally relates to techniques for controlling sensor input.

BACKGROUND

Various devices include multiple sensors configured to receive user input. Sensors configured to respond to user finger placement or finger movement can at times receive inadvertent or unintentional input. Inadvertent or unintentional input can diminish a user's experience of a device, an application, etc., for example, by wasting time, causing erroneous selections, etc. Such issues can impact device and application design. As described herein, various technologies provide for enhanced control of sensor input.

SUMMARY

An apparatus includes timing circuitry configured to initiate a timing window in response to input sensed by an optical sensor, association circuitry configured to associate the input with additional input sensed by a different optical sensor if the additional input commences during the timing window and filter circuitry configured to filter out additional input sensed by a different optical sensor if the additional input commences after expiration of the timing window and prior to a subsequent initiation of the timing window. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Some types of sensors can be particularly sensitive to extraneous input. For example, optical sensors tend to be quite sensitive to a finger or an object. Where such a sensor is positioned adjacent to one or more keys of a keyboard (e.g., a high finger traffic location), it may receive inadvertent or unintentional input. The risk of receiving extraneous sensor input and frequency of extraneous input can depend on various factors. For example, sensor sensitivity, sensor size, sensor physics, user intent, user dexterity, user finger size, user typing style, user attention, user environment (e.g., stationary, in-transit, etc.) and other factors can affect risk, frequency or both risk and frequency of extraneous input.

Where a device includes multiple sensors such as multiple optical sensors within a notebook keyboard, avoidance of extraneous sensor input becomes a more complex problem. As described herein, in various examples, one or more time windows may be implemented to assist with filtering out extraneous sensor input.

Figure 1:
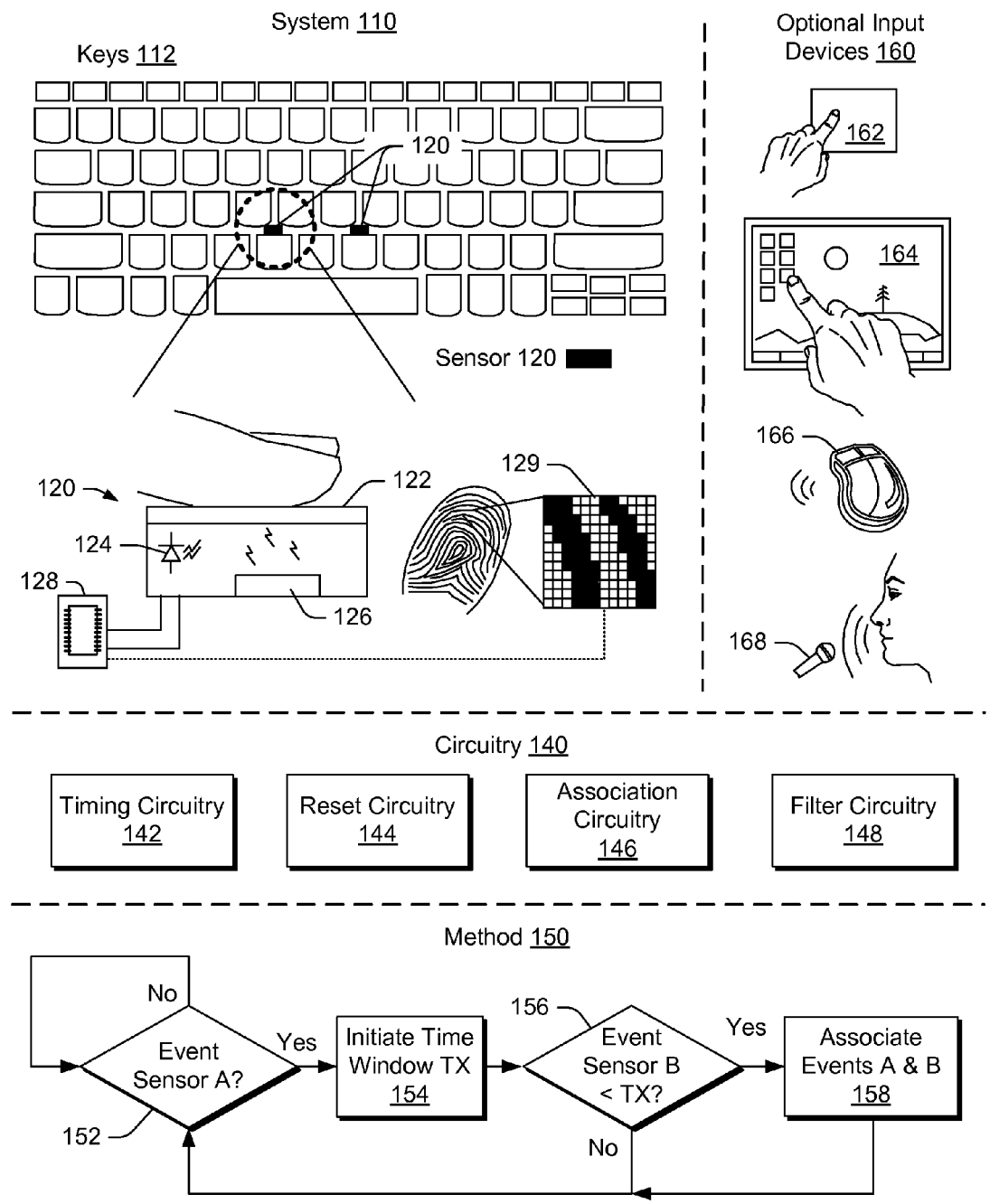
FIG. 1 is a series of diagrams of examples of a system, optional inputs, circuitry, and a method.

FIG. 1 shows an example of a system 110 that includes keys 112 and sensors 120. As shown, the system 110 is arranged as a computer keyboard with various character keys 112 and two sensors 120. Each of the sensors 120 may be configured as a so-called "optical trackpad" (e.g., an optical sensor). An optical trackpad is generally a sensor shaped as a "pad" configured to track an object using optical components. As described herein, tracking can include, for example, detecting presence or an object or objects, absence of an object or objects or motion of an object or objects.

An approximate diagram of an example of the sensor 120 is shown in FIG. 1. In the example of FIG. 1, the sensor 120 includes a surface 122, an emitter 124, a detector 126, and circuitry 128, which may be configured to output sensed information in the form of a digital array 129. For example, an object may be a finger or other object with surface indicia (e.g., consider fingerprint ridges, striations, or other indicia). When such an object contacts or comes into close proximity to the surface 122, surface indicia of the object are illuminated by radiation emitted by the emitter 124 (e.g., an emitting diode). Radiation reflected by the object (e.g., optionally due to impedance/index of refraction changes of a boundary of the surface 122) is detected by the detector 126. The detector 126 may be a CCD or other type of detector.

With respect to the circuitry 140, as described herein, timing circuitry 142 may include circuitry configured to initiate a time window (e.g., responsive to receipt of information directly or indirectly from one or more sensors). The timing circuitry 142 may include a multiplexer configurable to receive information from one or more sensors (e.g., a left sensor, a right sensor or both a left sensor and a right sensor). The timing circuitry 142 may include one or more of an amplifier, a filter, or other component(s) for processing information. The timing circuitry 142 may conform to one or more communication standards (e.g., bus, wired, wireless, etc.). The timing circuitry 142 may include a trigger, a sampling rate, etc., that aims to respond to receipt of sensor input.

As described herein, reset circuitry 144 is configured to effectuate a reset, for example, to allow for re-initiation of a time window responsive to sensor input. For example, if no sensor input is received for a period of time, the reset circuitry 144 may issue a reset signal that causes the timing circuitry 142 to begin polling or otherwise become responsive to receipt of sensor input.

In the example of FIG. 1, association circuitry 146 is configured to associate sensor input from a first sensor with sensor input from a second sensor or more generally to associate input from multiple sensors. For example, where receipt of input from a first sensor causes the timing circuitry 142 to initiate a time window and where receipt of input from a second sensor occurs during the time window, the association circuitry 146 can associate the inputs for purposes of issuing a command or commands.

As to filter circuitry 148, such circuitry is configured to filter out extraneous sensor input. For example, where receipt of input from a first sensor causes the timing circuitry 142 to initiate a time window and where receipt of input from a second sensor occurs after expiration of the time window, the filter circuitry 148 can filter out the sensor input from the second sensor such that an extraneous command is not issued in response to extraneous sensor input. In such an example, a command may be issued in response to receipt of input from the first sensor but no command is issued in response to receipt of input from the second sensor because the input was not received during the time window.

As described herein, a system may provide for assigning one or more status indicators for one or more sensors. For example, where one of the sensors 120 is assigned a dominant status by assignment circuitry and the other one of the sensors 120 is assigned a nondominant status by the assignment circuitry, the circuitry 140 may respond to sensed information from one or more of the sensors 120 based at least in part on assigned status. For example, the timing circuitry 142 may initiate a time window responsive to receipt of input from a dominant sensor only. In such an example, receipt of input from a nondominant sensor during the time window may be considered valid and actionable whereas input from a nondominant sensor after expiration of the time window may be considered invalid and extraneous (i.e., to be filtered out such that it has no operational effect). As described herein, the circuitry 140 may include assignment circuitry configured to assign status to one or more sensors based at least in part on information sensed by one or more sensors (e.g., based on use, a gesture, etc.). In FIG. 1, other circuitry may be configured to operate in conjunction with the timing circuitry 142, the reset circuitry 144, the association circuitry 146, or the filter circuitry 148.

In FIG. 1, a method 150 includes a decision block 152 for receiving information and making a decision, an initiation block 154 for initiating a time window, a decision block 156 for receiving information and making a decision and an association block 158 for associating received information. For example, the decision block 152 may decide that an event occurred at sensor A (e.g., a user placed a finger over a surface of an optical sensor) and call for initiation of a time window TX by the initiation block 154. The decision block 156 may decide whether an event occurred at sensor B (e.g., a user placed a finger over a surface of an optical sensor) during the time window TX or after expiration of the time window TX. According to the example of FIG. 1, where the decision block 156 decides that an event at sensor B occurred during the time window TX, the method 150 continues at the association block 158 to associate the event for sensor A with the event for sensor B. Where the decision block 156 decides that an event at sensor B did not occur during the time window TX, the method 150 continues, for example, to the decision block 152 (e.g., to wait for another event at sensor A).

In the foregoing example, sensor A may be a sensor with a dominant status and sensor B may be a sensor with a nondominant status. Such statuses may optionally be assigned based on handedness of a user. As described herein, handedness (or dominant or nondominant status) may be, for example, set by a user (e.g., via a switch, an instruction, graphical control, etc.) or determined automatically (e.g., based on sensor usage). For example, sweeping a finger over a right sensor may result in assignment circuitry assigning the right sensor a dominant status and assigning a left sensor a nondominant status.

As described herein, multiple sensors may be configured for receipt of sensor input for gestures. Gesture input may involve, for example, simultaneous sweeping of a finger over a dominant sensor and a finger over a nondominant sensor (e.g., or other combination of sensors, optionally including multiple nondominant sensors).

FIG. 1 also shows various optional input devices 160, including a touchpad 162, a touchscreen 164, a mouse 166 and a microphone 168. Such devices may be optionally used in conjunction with one or more of the sensors 120.

As described herein, optical sensors may collectively provide for actions such as pointing, left/right click, gesturing, etc. A group of sensors can consist of a primary sensor and one or more secondary sensors. A primary sensor may be considered a dominant sensor and identified by its physical location, user configuration or one or more other factors. In various scenarios, a user may predominately use the same sensor (i.e., a primary sensor) for basic pointing functions like pointer movement and area selection. A primary sensor may be positioned adjacent to one or more keys of a keyboard or elsewhere. Where one or more secondary sensors are placed adjacent to one or more keys of a keyboard, they may be prone to inadvertent touches from a user, especially while the user is typing.

Some computers include a touchpad (see, e.g., touchpad 162) that relies on an algorithm to filter out or ignore touchpad contact if one or more keyboard keys are pressed or if a pointing stick is in use. Such an algorithm relies on prior use of the keyboard to trump subsequent use of the touchpad or pointing stick (e.g., keyboard keys over touchpad or keyboard keys over pointing stick). Such an algorithm only allows for recognition of input via the touchpad or the pointing stick if the input occurs after a predetermined keyboard idle time (i.e., a time for which no keyboard key input occurs).

As explained with respect to FIG. 1, input via a secondary sensor can be recognized (e.g., allowed) only if it occurs within a predetermined amount of time of input via a primary sensor. For example, for the method 150, the time window TX may be in a range from about 20 ms to about 1 second. Consequently, where sensor input occurs via a sensor (e.g., secondary or nondominant sensor) more than TX after occurrence of sensor input via a different sensor (e.g., primary or dominant sensor), the latter sensor input may be filtered out or ignored.

As described herein, various systems, circuitry, methods, etc., may operate based on an assumption that, for example, a single point of contact on a secondary sensor is typically only intentional if it follows contact on a primary sensor; hence, after a predetermined amount of time, contact on a secondary sensor is assumed to be inadvertent.

As described herein, another time window or time requirement can be imposed on a sensor (e.g., a primary sensor, a dominant sensor, etc.). For example, a method can optionally require a primary sensor to be utilized for at least a predetermined amount of time for any input on a secondary sensor to be recognized. Such an approach can be implemented alternatively or additionally to the time window approach described with respect to the method 150 of FIG. 1. Such an approach can help ensure that initiating contact on a primary sensor was intentional. As described herein, a time window for a primary sensor (e.g., or dominant sensor) may optionally be in a range from about 20 ms to about 5 seconds.

As described herein, certain combinations of input may trump one or more techniques that aim to filter out sensor input. For example, if a system includes two or more secondary sensors, simultaneous contact on two or more of the secondary sensors may be likely due to a user intending to use these sensors for gesturing. When such simultaneous contact occurs, the requirement for a time threshold from input on a primary sensor may be lifted (e.g., not implemented or otherwise disabled).

As described herein, an apparatus (e.g., machine, computing device, etc.) can include timing circuitry configured to initiate a timing window in response to input sensed by an optical sensor, reset circuitry configured to reset the timing circuitry in response to a reset trigger where the reset allows for re-initiation of the timing window, association circuitry configured to associate the input with additional input sensed by a different optical sensor if the additional input commences during the timing window, and filter circuitry configured to filter out additional input sensed by a different optical sensor if the additional input commences after expiration of the timing window and prior to a subsequent initiation of the timing window. Such an apparatus may include timing circuitry configured to time a duration of the input sensed by the optical sensor, for example, timing circuitry configured to initiate the timing window only if the duration of the input sensed by the optical sensor exceeds a predetermined duration. In another example, timing circuitry may be configured to shift the timing window in time based at least in part on the duration of the input sensed by the optical sensor (e.g., a sliding window that may commence upon a cessation of input).

With respect to association circuitry, such circuitry may associate input with additional input depending on status of an optical sensor in relationship to status of a different optical sensor. For example, an optical sensor may have a dominant status and a different optical sensor may have a nondominant status.

In various examples, a device may be configured to issue a reset trigger, for example, based on an amount of received input sensed by an optical sensor after expiration of a timing window (e.g., where no input is received for a period of time, which may be a period in excess of a time window such as the window TX of FIG. 1, a reset may occur).

In various examples, a device may include optical sensors where at least one optical sensor is disposed adjacent at least one key of a computer keyboard. Further, as described herein, a device may include circuitry to call for rendering of a graphic to a display that indicates an operative state or states of sensors, windows, etc. (e.g., to indicate that filter circuitry filtered out some additional input).

Figure 2:
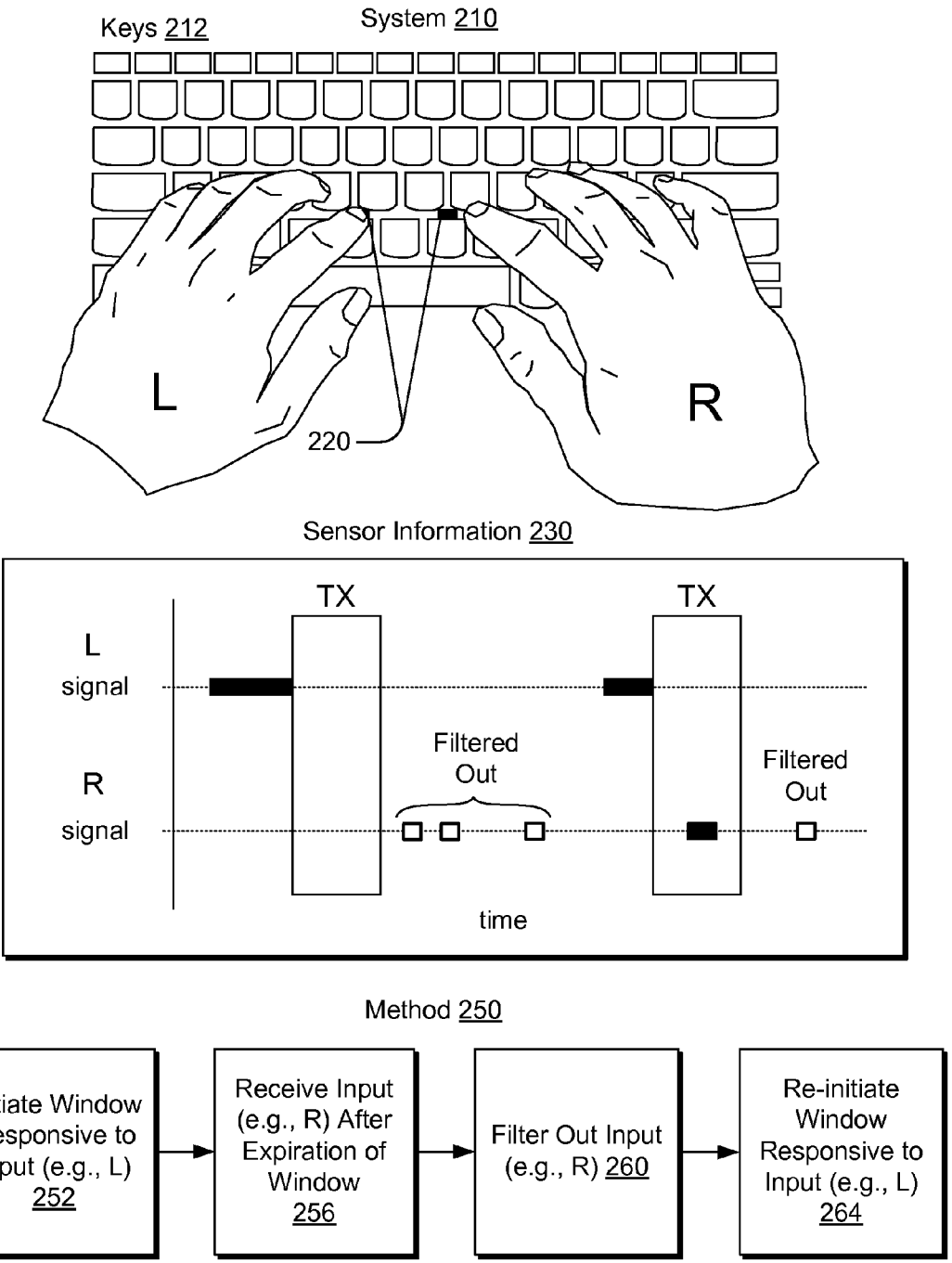
FIG. 2 is a series of diagrams of examples of a system, sensor information and a method.

FIG. 2 shows an example of a system 210 that includes keys 212 and left and right optical sensors 220. In the example of FIG. 2, a user's left index finger (e.g., an object) is placed or moved over the left optical sensor. In response, the left optical sensor provides sensor information 230 such as a signal with respect to time indicative of the placement or motion of the left index finger. A plot of the sensor information 230 provides examples of two scenarios where a time window TX is initiated. In the first scenario, the right optical sensor does not provide any sensed input (e.g., due to a finger or other object) during the duration of the time window TX. However, after expiration of the time window TX, intermittent sensed input is received via the right optical sensor (e.g., due to motion of a right hand finger over the right optical sensor). As such input occurred after expiration of the time window TX, the sensed input received via the right optical is filtered out. In the second scenario, the right optical sensor provides sensed input during the duration of the time window TX. Accordingly, the sensed input received via the right optical sensor is considered valid and may optionally be associated with the sensed input received via the left optical sensor (e.g., to form a command, commands, etc.). In the second scenario, the right optical sensor also provides sensed input after expiration of the time window TX, which is considered invalid and filtered out.

FIG. 2 also shows an example of a method 250 that includes an initiation block 252, a reception block 256, a filter block 260 and a re-initiation block 264. Per the example, the initiation block 252 provides for initiating a time window responsive to sensed input, the reception block 256 provides for receipt of sensed input after expiration of the initiated time window, the filter block 260 provides for filtering out the sensed input because it occurred after expiration of the initiated time window and the re-initiation block 264 provides for re-initiating a time window responsive to receipt of subsequent sensed input. As described herein, the blocks 256 and 260 may be effectuated as a blanking period. For example, the time window initiated in response to sensed input by one sensor may cause electronically or by other means blanking of one or more other sensors. More specifically, consider the circuitry 128 of FIG. 1 where such circuitry may be configured to receive signals from multiple sensors via a bus. The circuitry 128 may optionally implement a blanking period (e.g., a time window) that does not process or does not read signals from one or more of the sensors. In such an example, the circuitry 128 may optionally be programmed to implement sensor control logic (e.g., based on a status or other setting).

As described herein, one or more settings may be set that have at least some relationship to a sensor or sensed information (e.g., via one or more of sensor circuitry, assignment circuitry, control circuitry, or other circuitry). In the example of FIG. 2, settings may include one or more of an enable/disable setting, a sensitivity setting, a filter setting, an application specific setting, or another setting.

As described herein, a method can include initiating a timing window responsive to receiving input from an optical sensor, after expiration of the timing window, receiving additional input from a different optical sensor, filtering out the additional input, and, after expiration of the timing window, reinitiating the timing window responsive to subsequently receiving input from the optical sensor. Such a method may further include, after the reinitiating, subsequently receiving additional input from the different optical sensor during the reinitiated timing window and optionally include associating subsequently received input and subsequently received additional input. As described herein, where sensed information is associated, a method may include issuing a command based at least in part on the associating.

As described herein, a method can include timing a duration of receiving input from an optical sensor (e.g., how long a finger is in contact with or otherwise causing an optical sensor to output a sense signal). For example, a method may include initiating a timing window only if the duration of the receiving input from the optical sensor exceeds a predetermined value.

As described herein, a method may include rendering a graphic to a display to indicate filtering out of some additional input, rendering a graphic to a display to indicate pendency of one or more timing windows, etc.

As described herein, a method may account for status of a sensor or sensors. For example, a method may include, prior to initiating a time window, determining whether received input is input from an optical sensor with a dominant status or a nondominant status. In such an example, a method may include initiating the timing window only if the determining determines that the input is input from an optical sensor with a dominant status.

Figure 3:
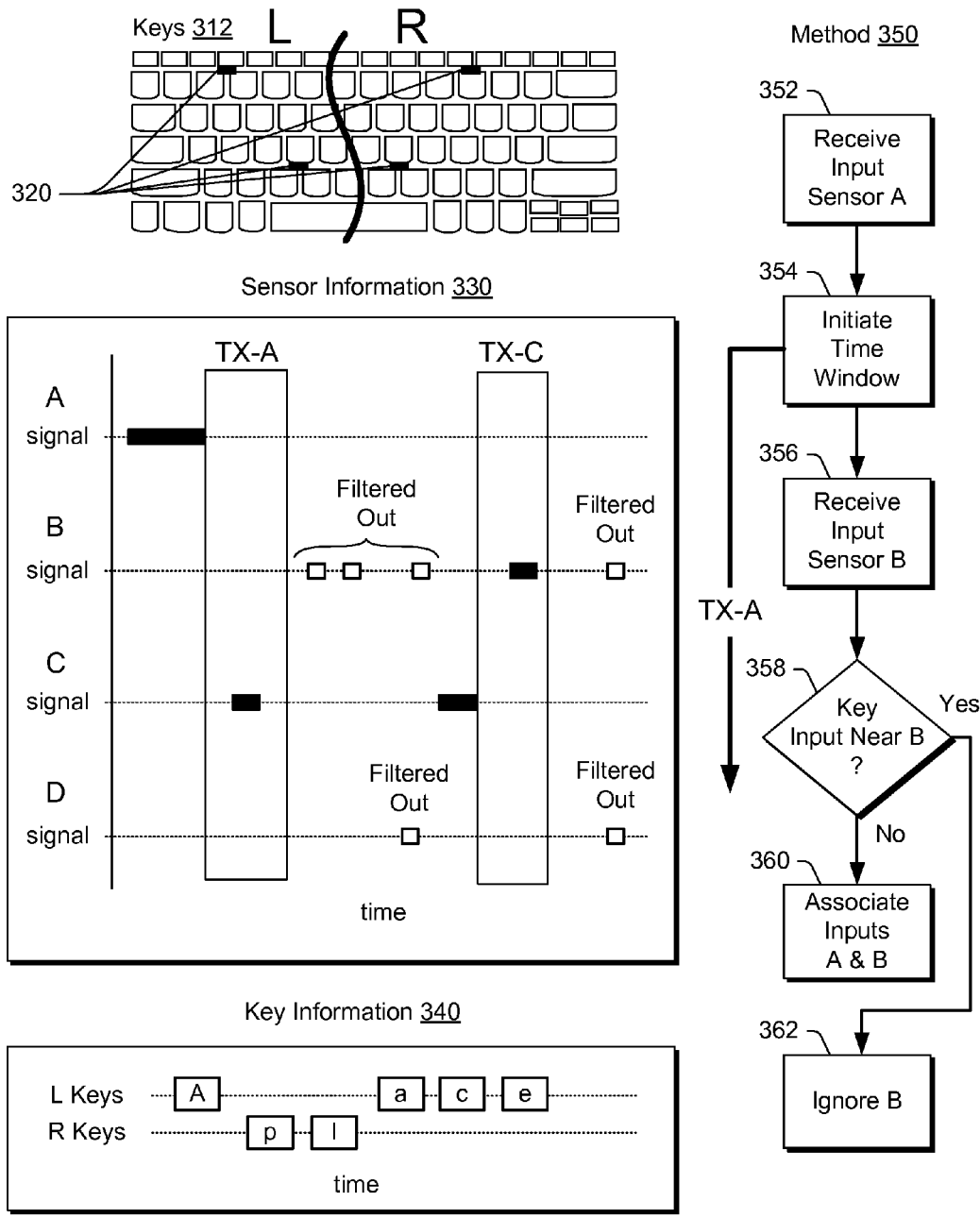
FIG. 3 is a series of diagrams of examples of sensor information, key information and a method.

FIG. 3 shows examples of sensor information 330 as associated with optical sensors 320 (e.g., sensors A, B, C and D), key information 340 as associated with keys 312, and a method 350. A plot of the sensor information 330 provides examples for two scenarios, corresponding to time windows TX-A and TX-C, respectively. In the first scenario, sensed input is received via sensor A, which causes implementation of the time window TX-A. During the time window TX-A, sensed input is received via sensor C, which is considered valid and optionally associated with the sensed input received via sensor A (e.g., to form one or more commands). After expiration of the time window TX-A, sensed inputs are received via sensor B and sensor D, however, such sensed inputs are filtered out.

In the second scenario, sensed input is received via sensor C, which causes implementation of the time window TX-C. During the time window TX-C, sensed input is received via sensor B, which is considered valid and optionally associated with the sensed input received via sensor C (e.g., to form one or more commands). After expiration of the time window TX-C, sensed inputs are received via sensor B and sensor D, however, such sensed inputs are filtered out.

As described herein, one or more sensors may be assigned a primary or dominant status such that receipt of sensed input via the one or more sensors initiates a time window that acts to classify sensed information from one or more other sensors, for example, as being valid or invalid.

With respect to the key information 340, the example of FIG. 3 categorizes key information as being left hand key information or right hand key information. Specifically, the example of FIG. 3 shows the phrase "A place" as being typed via four left hand keys and two right hand keys. Left and right categorizations may be assigned as indicated by a curved line over the keys 312. As described herein, such assignment may be by a default setting or a user may optionally assign keys, for example, based on typing style. Categorized key information may optionally be used in conjunction with one or more time windows for decision making as to sensed input, especially via one or more optical sensors where each optical sensor is positioned adjacent to at least one key. In another example, an optical sensor may include a listing of adjacent keys and where a keystroke is registered for one of the adjacent keys, substantially simultaneous information sensed via the optical sensor may be processed (e.g., filtered or ignored) based on registration of the keystroke.

The method 350 of FIG. 3 includes a reception block 352 for receiving input via sensor A, an initiating block 354 for initiating a time window TX-A responsive to the receipt of input via sensor A, another reception block 356 for receiving input via sensor B during the time window TX-A, and a decision block 358 for deciding whether any key input occurred via a key near sensor B. According to the example of FIG. 3, where the decision block 358 decides that no key input occurred for a key near sensor B, the method 350 associates the sensed inputs of sensor A and sensor B and where the decision block 358 decides that key input occurred for a key near, the method 350 ignores sensed input of sensor B.

As described herein, key information may be used to decide whether sensed information should be considered valid or invalid and, if valid, optionally associated with other sensed information. Such an approach can reduce a system's response to extraneous sensed inputs and enhance a user's experience, especially where typing may be performed in conjunction with commands input via one or more optical sensors.

Figure 4:
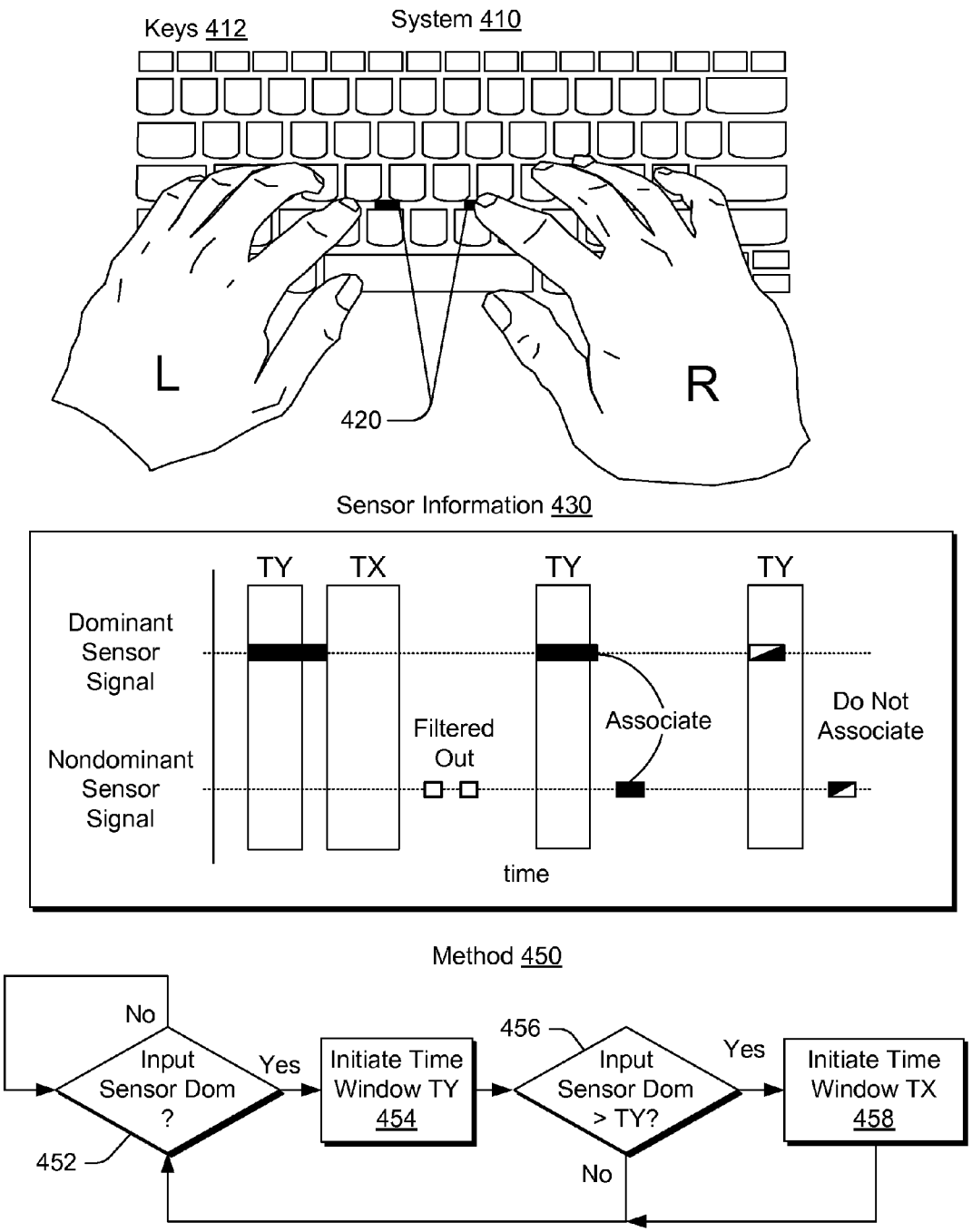
FIG. 4 is a series of diagrams of examples of a system, sensor information and a method.

FIG. 4 shows an example of a system 410 that includes keys 412 and left and right optical sensors 420, examples of sensor information 430 and an example of a method 450. In FIG. 4, the sensor information 430 provides examples for three scenarios. In the first scenario, sensed information received via a sensor with a dominant status initiates a time window TY. As the sensed information received via the sensor occurs for a duration exceeding the time window TY, the input is considered deliberate or valid. Accordingly, another time window TX is initiated in response to receipt of the sensed input via the sensor with the dominant status. In the first scenario, sensed input is received via a sensor with a nondominant status after expiration of the time window TX, as mentioned, such input may be considered extraneous and filtered out.

In the second scenario, sensed information received via a sensor with a dominant status initiates a time window TY. As the sensed information received via the sensor occurs for a duration exceeding the time window TY, the input is considered deliberate or valid. Further, sensed information received via a nondominant sensor is treated as being associated with the sensed information of the dominant sensor.

In the third scenario, sensed information received via a sensor with a dominant status initiates a time window TY. As the sensed information received via the sensor does not occur for a duration exceeding the time window TY, subsequent sensed information received via a nondominant sensor is treated as not being associated with the sensed information of the dominant sensor. Further, in the example of the third scenario, whether the sensed information sensed via either sensor is valid or invalid may be determined based on one or more criteria.

The method 450 of FIG. 4 includes a decision block 452 for deciding whether sensed input is received via a sensor with a dominant status, an initiating block 454 for initiating a time window TY responsive to the receipt of input via a sensor with a dominant status, and another decision block 456 for deciding whether sensed input continues to be received via the sensor with a dominant status for a duration greater than the time window TY. Per the example method 450, where the decision block 456 decides that the input received via the sensor with a dominant status has a duration in excess of the time window TY, an initiation block 458 provides for initiating a time window TX (e.g., as explained with respect to the first scenario example). Alternatively, where the decision block 456 decides that the input received via the sensor with a dominant status does not have a duration in excess of the time window TY, the method 450 returns, for example, to the decision block 452.

Figure 5:
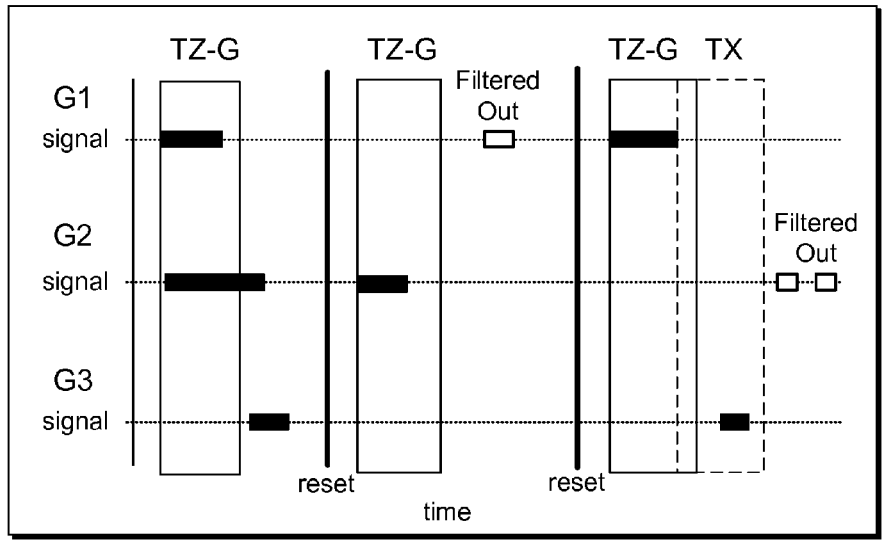
FIG. 5 is a series of diagrams of examples of sensor information and methods.
Figure 5:
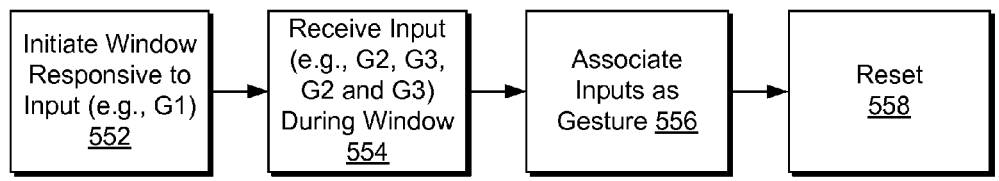
Figure 5:
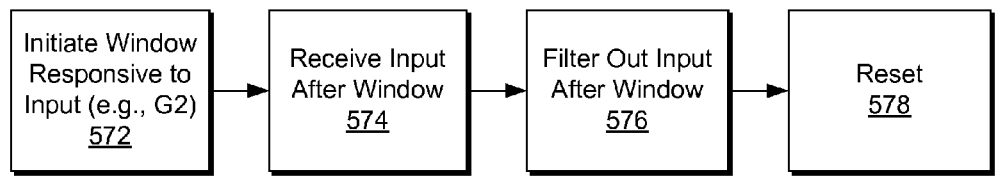
Figure 5:
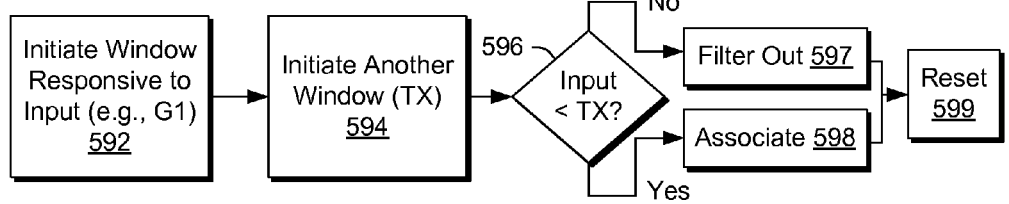

FIG. 5 shows examples of gesture sensor information 530 and examples of methods 550, 570 and 590. The gesture sensor information 530 provides examples for three scenarios related to information received via gesture sensors G1, G2 and G3. In the first scenario, in response to receipt of sensed information via the sensor G1, a time window TZ-G is initiated. As indicated, sensed information via the sensor G2 is received during the time window TZ-G and considered as being associated with the sensed information received via the sensor G1. Further, as sensed information was received via two sensors during the time window TZ-G, a channel for sensed information from another sensor may be open to account for particular known gestures. Per the first scenario, sensed information received after the time window TZ-G via sensor G3 is considered as being associated with a gesture involving input via sensors G1 and G2. At a later point in time, a reset occurs that acts to reset circuitry configured for handling gestures.

As described herein, if there are two or more secondary sensors (e.g., sensors with nondominant status) substantially simultaneous contact on two or more of the secondary sensors (e.g., G1 and G2 in the first scenario) is likely due to the user intending to use these sensors for gesturing. When such a situation occurs, a requirement as to a time threshold from input on a primary sensor may be lifted. Substantially simultaneous input may optionally be considered as input received via two or more sensors within a period of about 20 ms or less. For example, a threshold value may be set to a default value (e.g., 20 ms or other appropriate value) or selected or adjusted by a user or calibration technique for purposes of gesture input (e.g., to compare times for successive inputs to determine if such input is associated with a gesture).

As described herein, gesturing by manipulation of a hand or hands to cause input via multiple sensors can optionally override initiation of a window (e.g., a TX window), for example, even where the multiple sensors have nondominant status. Consider as an example a scenario involving three sensors: one dominant (e.g., sensor G1) and two nondominant (e.g., sensors G2 and G3). If a user touches nondominant sensor G2, holds contact to this sensor and then touches nondoiminant sensor G3, circuitry may be configured to enter a gesture mode that indicates a user is intending to gesture (pinch to zoom, pivot to rotate, mimic to scroll, etc.). A gesture mode may be initiated by receipt of substantially simultaneous sensed input via multiple sensors and, for example, terminated after issuance of a command associated with a gesture. A gesture mode may optionally be triggered based on a "hold" by one or more sensors and receipt of subsequent input via another sensor during the hold (see, e.g., G1 and G2 received during TZ-G, which may be considered simultaneous contact during an overlapping period of time).

As described herein, circuitry may be configured (e.g., optionally based on instructions stored in memory) to instruct a device to associate substantially simultaneous input sensed by two or more sensors with a gesture command. A gesture mode may be configured for implementation when substantially simultaneous sensed input is received, for example, even by one or more nondominant or secondary sensors after expiration of a window initiated by sensed input received via a dominant or primary sensor (e.g., a scenario that may otherwise filter out such input).

As described herein, user settings may allow a gesture mode to be enabled based on type of executing application or one or more other criteria. Accordingly, techniques may be implemented such that input via multiple nondominant sensors can initiate action that leads to, for example, issuance of a gesture command. Such sensed input may be considered valid in response to simultaneous sensed input across multiple nondominant sensors or, more generally, where circuitry may recognize sensed input via multiple sensors as being associated with a gesture (e.g., based on a comparison to one or more preprogrammed combinations of sensed input that define gestures).

In the second scenario, sensed information is received via the sensor G2, which initiates a time window TZ-G. As no other information is sensed via the sensors G1 and G3 during the duration of the time window TZ-G, information sensed after the expiration of the time window TZ-G is filtered out (e.g., consider information sensed via the sensor G1). At a later point in time, a reset occurs that acts to reset circuitry configured for handling gestures.

In the third scenario, sensed information is received via the sensor G1, which causes implementation of a time window TZ-G and eventually another time window TX. In the third scenario, the time window TX allows for input received via sensors G2 or G3 to be associated with that of sensor G1. As indicated, sensed information received via the sensor G2 that occurs after expiration of the time window TX is filtered out.

With respect to the method 550 of FIG. 5, an initiation block 552 provides for initiating a time window responsive to input via a sensor, a reception block 554 provides for receiving input via one or more other sensors during the time window, an association block 556 provides for associating inputs as a gesture and a reset block 558 provides for resetting circuitry, for example, to allow a user to make another gesture (e.g., same gesture at a later time or a different gesture).

With respect to the method 570 of FIG. 5, an initiation block 572 provides for initiating a time window responsive to input via a sensor, a reception block 574 provides for receiving input via one or more other sensors after expiration of the time window, a filter block 576 provides for filtering out one or more inputs and a reset block 578 provides for resetting circuitry.

With respect to the method 590 of FIG. 5, an initiation block 592 provides for initiating a time window responsive to input via a sensor, another initiation block 594 provides for initiating another time window and a decision block 596 decides whether sensed input is received via one or more other sensors during the latter initiated time window. Per the decision block 596, input received after expiration is filtered out per a filter block 597 while input received prior to expiration is associated with other input per an association block 598. As indicated in FIG. 5, a reset block 599 may follow to reset circuitry.

Figure 6:
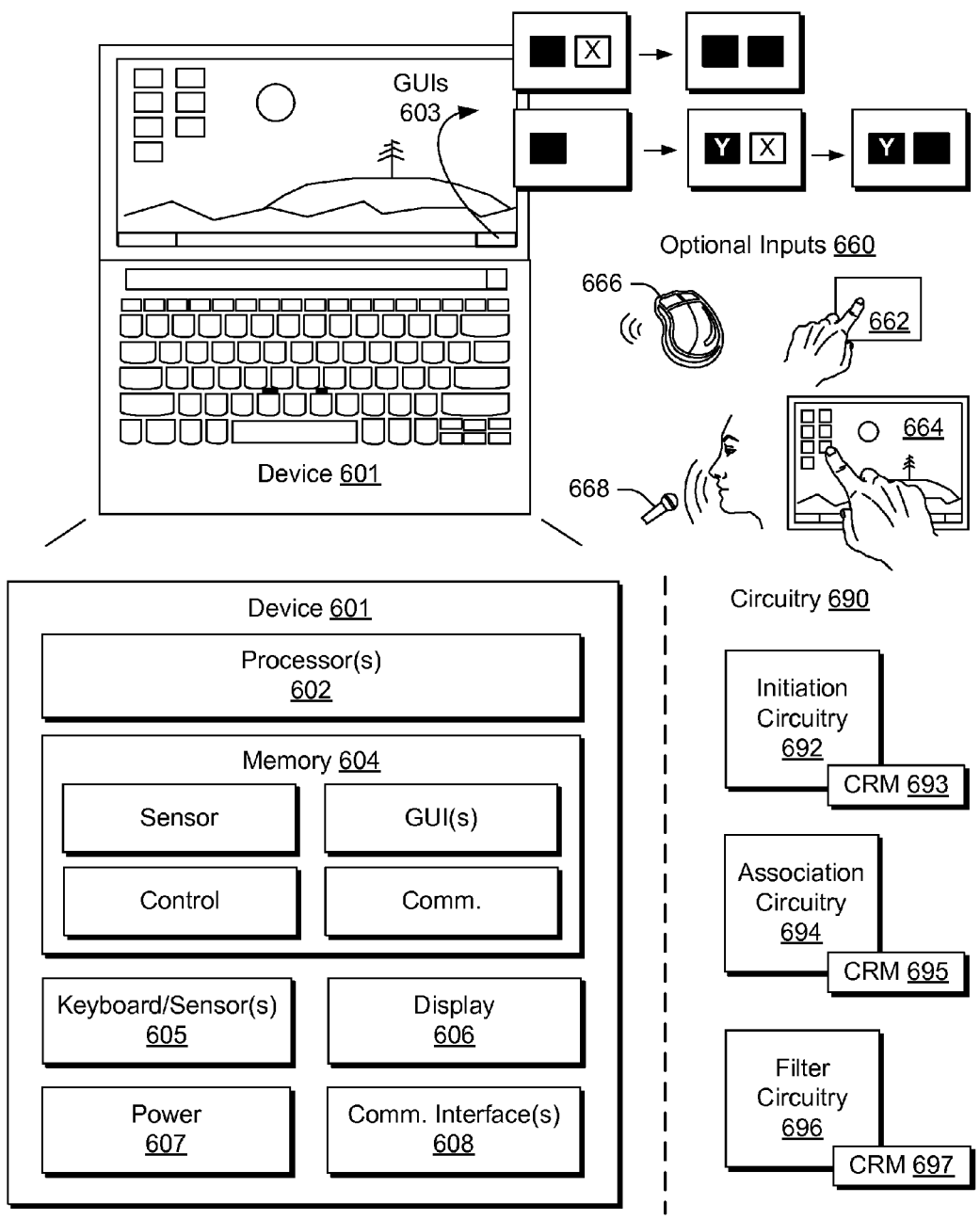
FIG. 6 is a series of diagrams of examples of a device, graphical user interfaces, optional inputs and circuitry.

FIG. 6 shows an example of a device 601, graphical user interfaces 603, some examples of circuitry 690 that may be included in the device 601 and some other, optional input devices 660. In the example of FIG. 6, the device 601 includes one or more processors 602 (e.g., cores), memory 604, a keyboard with one or more sensors 605, a display 606, a power supply 607 and one or more communication interfaces 608. As described herein, a communication interface may be a wired or a wireless interface. In the example of FIG. 6, the memory 604 can include one or more modules such as, for example, a sensor module, a control module, a GUI module and a communication module. Such modules may be provided in the form of instructions, for example, directly or indirectly executable by the one or more processors 602.

The device 601 may include the circuitry 690. In the example of FIG. 6, the circuitry 690 includes initiation circuitry 692, association circuitry 694 and filter circuitry 696. Such circuitry may optionally rely on one or more computer-readable media that includes computer-executable instructions. For example, the initiating circuitry 692 may rely on CRM 693, the association circuitry 694 may rely on CRM 695 and the filter circuitry 696 may rely on CRM 697. While shown as separate blocks, CRM 693, CRM 695 and CRM 697 may be provided as a package (e.g., optionally in the form of a single computer-readable storage medium). As described herein, a computer-readable medium may be a storage device (e.g., a memory card, a storage disk, etc.) and referred to as a computer-readable storage medium.

As described herein, the device 601 may include or be part of a system that includes one or more of a touchpad 662, a touchscreen 664, a mouse 666 or a microphone 668. The device 601 may include or be part of a system that includes a video camera (e.g., a webcam), which may be configured to recognize or track user input.

With respect to the GUIs 603, these may be configured to display various states of sensed input received via the one or more sensors 605. For example, where a keyboard includes two sensors (e.g., a left sensor and a right sensor), a graphic may display a particular graphic for sensed information received via a sensor and another graphic for a time window (e.g., as being related to a sensor). The GUIs 603 illustrate two example scenarios. In the first scenario, a black filled box and an open box with an "X" indicate that sensed information received via the left sensor initiated a time window "X", which relates to the right sensor. A following graphic shows two black filled boxes to indicate that information was received via the right sensor during the time window "X". In the second scenario, a black filled box indicates that sensed information is being received via the left sensor. A following graphic indicates with a "Y" that a duration of input was met for the left sensor, which, in turn, initiated a time window "X". A following graphic indicates that sensed input was received via the right sensor during the time window "X". Such GUIs may provide visual feedback to a user and enhance use of sensors such as optical sensors positioned adjacent one or more keys of a keyboard. Such GUIs may provide feedback that can allow a user to tune one or more parameters (e.g., related to associations, time windows, control logic, etc.).

As described herein, one or more computer-readable storage media can include computer-executable instructions to instruct a computer to: to initiate a timing window in response to input sensed by a sensor with a dominant status; to associate the input with additional input sensed by a sensor with a nondominant status if the additional input commences during the timing window; and to filter out additional input sensed by a sensor with a nondominant status if the additional input commences after expiration of the timing window and prior to a subsequent initiation of the timing window. Such media may further include instructions to instruct a computer to time a duration of input sensed by a sensor with a dominant status and to initiate a timing window only if the duration exceeds a predetermined duration.

Figure 7:
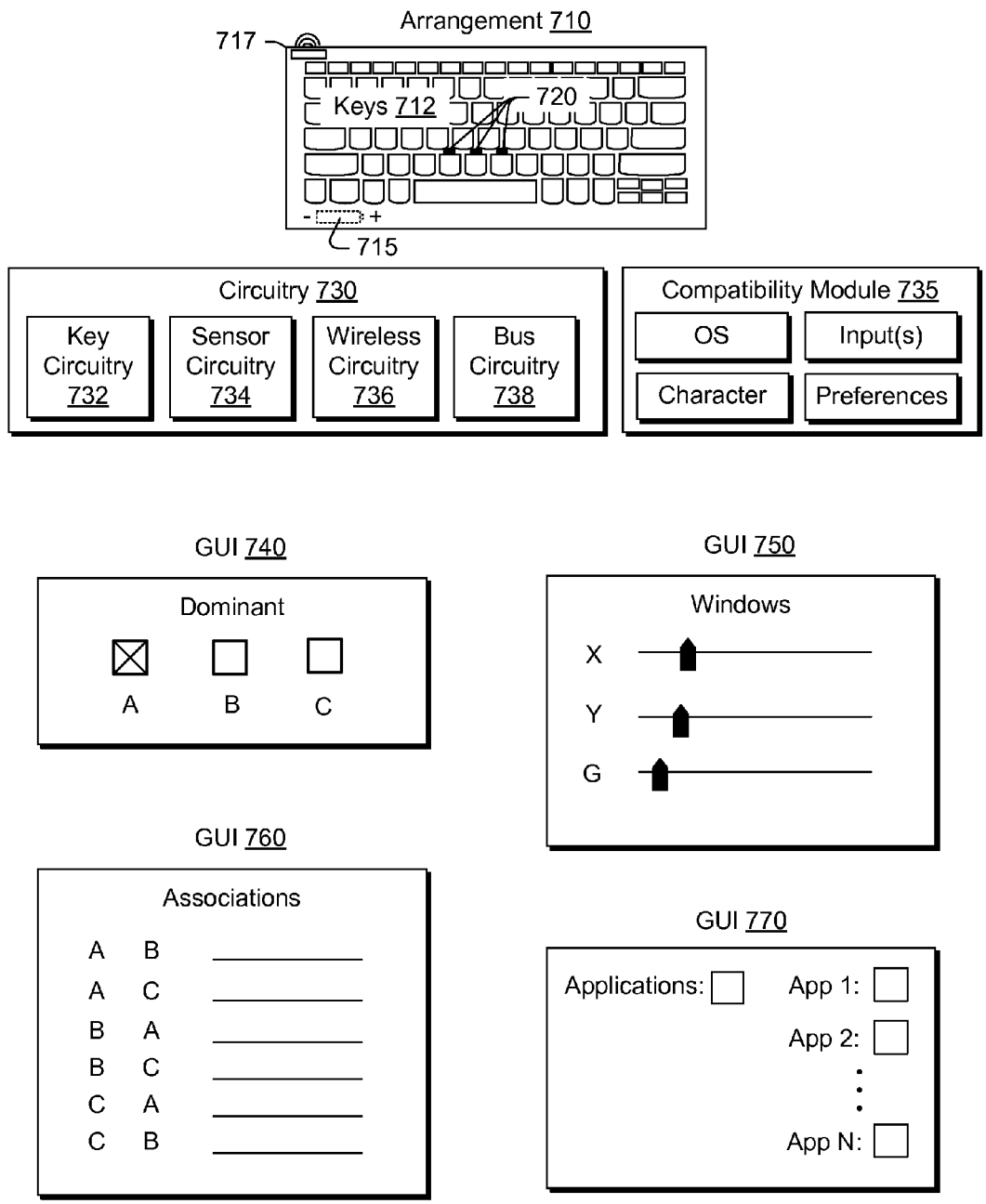
FIG. 7 is a series of diagrams of examples of an arrangement of sensors, circuitry, modules and graphical user interfaces.

FIG. 7 shows examples of a particular arrangement 710, circuitry 730, a compatibility module 735 and GUIs 740, 750, 760 and 770. In the arrangement 710, a system with keys 712 and sensors 720 may optionally include one or more of an interface, a touchpad, a touchpad with associated buttons, a hand rest, a joystick, a communication cable (e.g., USB or other, optionally configured to supply power), a power supply 715 (e.g., one or more batteries) and a wireless communication interface 717. As indicated, an arrangement may include more than two optical sensors.

As described herein, a system may include the circuitry 730, which may include one or more of key circuitry 732, sensor circuitry 734, wireless communication circuitry 736 and bus circuitry 738. Where key information is used in conjunction with sensor information, a bus or circuitry (e.g., wired or wireless) may be appropriately configured to provide such signals to a device for further processing and decision making. While the example arrangement 710 of FIG. 7 is shown as including a wireless communication, a wired connection may be provided (alternatively or additionally) for communication and optionally power.

As described herein, a compatibility module may be provided to allow for compatibility of a system. For example, the compatibility module 735 can include operating system (OS) compatibility configuration instructions, character set configuration instructions, input compatibility configuration instructions, preference configuration instructions, etc.

In the example of FIG. 7, the keys 712 may conform to a character set that includes F, G and V keys and H, J and N keys and left and right optical sensors. In such an example, a left optical sensor may be positioned adjacent to at least one or more of an F key, a G key and a V key and a right optical sensor may be positioned adjacent to at least one or more of an H key, a J key and an N key. In various examples, a left optical sensor is positioned adjacent to three keys and a right optical sensor is positioned adjacent to three keys. As described herein, one or more optical sensors may be positioned adjacent to one or more keys and generally at least two keys of a keyboard associated with one or more character sets.

With respect to various examples of GUIs, as described herein, a device (e.g., the device 601 of FIG. 6) may include circuitry configured for presentation of one or more GUIs. In the example of FIG. 7, the GUI 740 provides for assigning a sensor a dominant status, the GUI 750 provides for setting one or more time windows, the GUI 760 provides for associating sensed input received via multiple sensors (e.g., for commands, etc.), and the GUI 770 provides for having application specific settings (e.g., different settings for a drawing application, a word processing application, a gaming application, a video editing application, etc.). With respect to the commands of GUI 760, these may include default settings (e.g., A and B causes command X) and may allow for user customization or optionally customization for use by a particular application.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
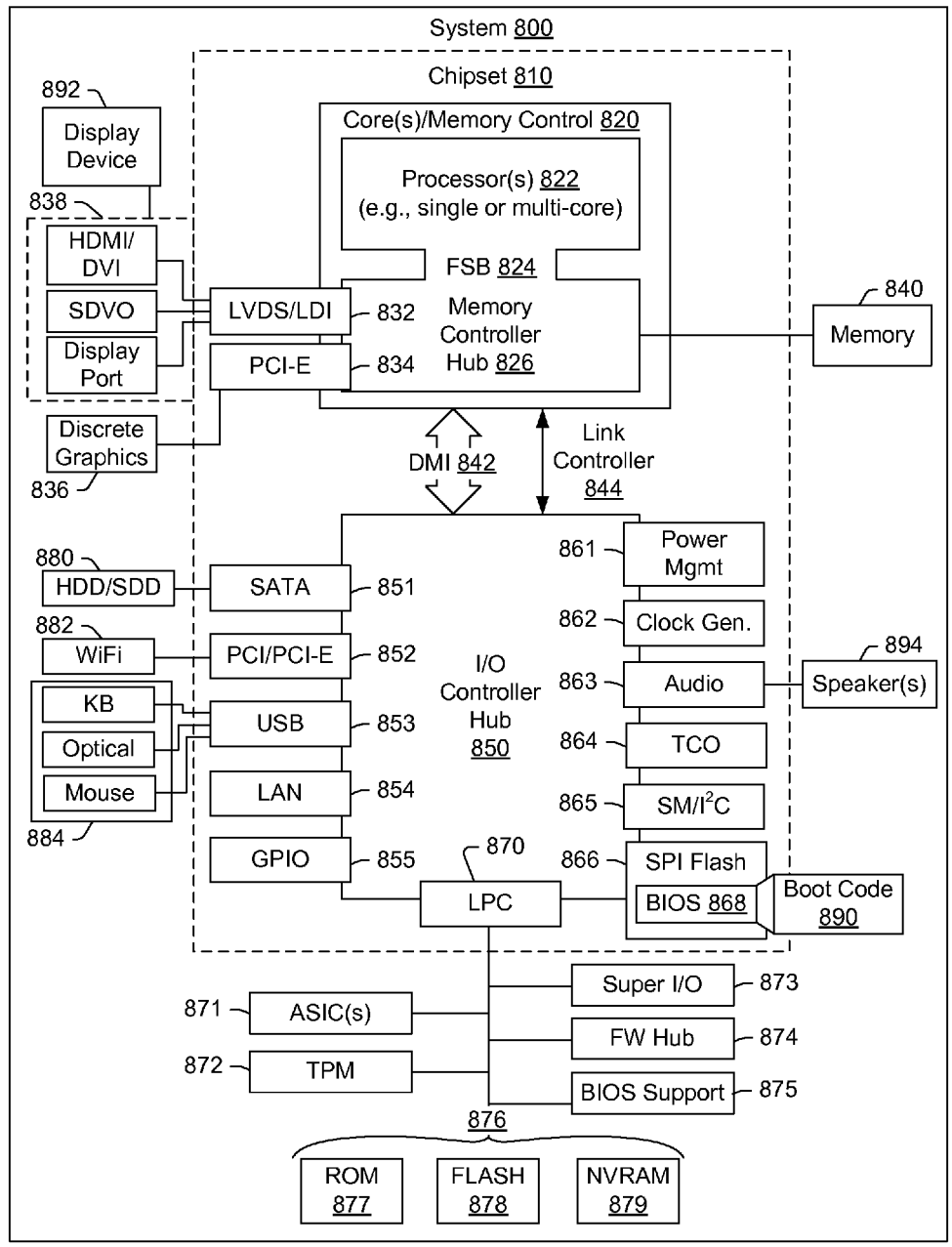
FIG. 8 is a diagram of an example of a machine.

While various examples of circuits or circuitry have been discussed, FIG. 8 depicts a block diagram of an illustrative computer system 800. The system 800 may be a desktop computer system, such as one of the ThinkCentre® or Think-Pad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As described herein, a device such as the device 601 may include at least some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors (see, e.g., the sensor 120 of FIG. 1), mice and various other devices (e.g., cameras, phones, storage, media players, etc.). On or more other types of sensors may optionally rely on the USB interface 853 or another interface (e.g., I²C, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   timing circuitry that initiates a timing window in response to input sensed by an optical sensor that comprises a dominant status wherein the timing circuitry comprises circuitry that times a duration of the input sensed by the optical sensor;
   reset circuitry that resets the timing circuitry in response to a reset trigger wherein the reset allows for re-initiation of the timing window and wherein the reset trigger comprises a trigger based on an amount of received input sensed by the optical sensor after expiration of the timing window;
   association circuitry that associates the input with additional input sensed by a different optical sensor if the additional input commences during the timing window wherein the different optical sensor comprises a non-dominant status; and
   filter circuitry that filters out additional input sensed by the different optical sensor if the additional input commences after expiration of the timing window and prior to a subsequent initiation of the timing window.

2. The apparatus of claim 1 wherein the timing circuitry comprises circuitry that initiates the timing window only if the duration of the input sensed by the optical sensor exceeds a predetermined duration.

3. The apparatus of claim 1 wherein the timing circuitry comprises circuitry that shifts the timing window in time based at least in part on the duration of the input sensed by the optical sensor.

4. The apparatus of claim 1 further comprising circuitry to call for rendering of a graphic to a display that indicates that the filter circuitry filtered out the additional input.

5. The apparatus of claim 1 wherein the association of the input with the additional input depends on status of the optical sensor in relationship to status of the different optical sensor.

6. The apparatus of claim 1 wherein the optical sensors comprise at least one optical sensor disposed adjacent at least one key of a computer keyboard.

7. The apparatus of claim 1 wherein, as to the reset trigger, the amount of received input sensed by the optical sensor after expiration of the timing window comprises no received input for a predetermined period of time.

8. A method comprising:
receiving input from an optical sensor that comprises a dominant status;
timing a duration of the receiving input from the optical sensor;
initiating a timing window responsive to the receiving input from the optical sensor;
after expiration of the timing window, receiving additional input from a different optical sensor that comprises a nondominant status;
filtering out the additional input; and
after expiration of the timing window, allowing for re-initiation of the timing window responsive to a reset trigger based on an amount of received input sensed by the optical sensor and, after allowing for re-initiation of the timing window, reinitiating the timing window responsive to subsequently receiving input from the optical sensor.

9. The method of claim 8 further comprising, after the reinitiating, subsequently receiving additional input from the different optical sensor during the reinitiated timing window.

10. The method of claim 9 further comprising associating the subsequently received input and the subsequently received additional input and issuing a command based at least in part on the associating.

11. The method of claim 8 wherein the initiating comprises initiating the timing window only if the duration of the receiving input from the optical sensor exceeds a predetermined value.

12. The method of claim 8 further comprising rendering a graphic to a display to indicate filtering out of the additional input.

13. The method of claim 8 further comprising rendering a graphic to a display to indicate pendency of the timing window.

14. The method of claim 8 wherein, as to the reset trigger, the amount of received input sensed by the optical sensor comprises no received input for a predetermined period of time.

15. One or more non-transitory computer-readable storage media comprising computer-executable instructions to instruct a computer, the instructions comprising instructions to:
assign a dominant status to one of two sensors and a non-dominant status to the other of the two sensors;
time a duration of input sensed by the sensor with the dominant status;
initiate a timing window in response to input sensed by the sensor with the dominant status;
associate the input with additional input sensed by the sensor with the nondominant status if the additional input commences during the timing window;
filter out additional input sensed by the sensor with the nondominant status if the additional input commences after expiration of the timing window and prior to a re-initiation of the timing window; and
after expiration of the timing window, allow for the re-initiation of the timing window responsive to a reset trigger based on an amount of received input sensed by the sensor with the dominant status.

16. The one or more non-transitory computer-readable storage media of claim 15 further comprising instructions to initiate a timing window only if the duration exceeds a predetermined duration.

17. The one or more non-transitory computer-readable storage media of claim 15 wherein, as to the reset trigger, the amount of received input sensed by the sensor with the dominant status comprises no received input for a predetermined period of time.

* * * * *